US012663304B2

(12) United States Patent
Alramadhan

(10) Patent No.: US 12,663,304 B2
(45) Date of Patent: Jun. 23, 2026

(54) DENSITY INVARIANT DISPLACER-TYPE LIQUID LEVEL MEASUREMENT UTILIZING DIFFERENTIAL PRESSURE TRANSMITTER

(71) Applicant: SAUDI ARABIAN OIL COMPANY, Dhahran (SA)

(72) Inventor: Ibrahim Samir Alramadhan, Al Hofuf (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 310 days.

(21) Appl. No.: 18/594,580

(22) Filed: Mar. 4, 2024

(65) Prior Publication Data

US 2025/0277687 A1     Sep. 4, 2025

(51) Int. Cl.
*G01F 25/20* (2022.01)
*G01F 23/04* (2006.01)
*G01F 23/16* (2006.01)
*G01F 23/80* (2022.01)

(52) U.S. Cl.
CPC ............ *G01F 23/04* (2013.01); *G01F 23/162* (2013.01); *G01F 23/804* (2022.01); *G01F 25/20* (2022.01)

(58) Field of Classification Search
CPC ...... G01F 23/162; G01F 23/04; G01F 23/804; G01F 25/20; G01F 23/20
See application file for complete search history.

(56) References Cited

U.S. PATENT DOCUMENTS 5,253,522 A * 10/1993 Nyce ................... G01F 23/0038
324/207.13
2022/0397443 A1* 12/2022 Beckett .................... G01N 9/14

FOREIGN PATENT DOCUMENTS

| CN | 107567310 B | 1/2021 | |
| GB | 2247531 A * | 3/1992 | ............... G01N 9/10 |
| JP | 2018205216 A * | 12/2018 | |

OTHER PUBLICATIONS

Chemical Engineering World (Cew) "Displacer Level Sensor Working." Chemical Engineering World, Jul. 21, 2019, chemicalengineeringworld.com/displacer-level-sensor-working/ (Year: 2019).*

(Continued)

*Primary Examiner* — Kristina M Deherrera
*Assistant Examiner* — Jean F Morello
(74) *Attorney, Agent, or Firm* — Osha Bergman Watanabe & Burton LLP

(57) ABSTRACT

Methods, apparatus, and systems for determining a level of a liquid in a liquid-containing vessel are disclosed. The liquid-containing vessel may be fluidically connected to a displacer cage. The method may include obtaining, with a load measurement device, a weight force of a displacer suspended from the load measurement device and disposed within the displacer cage. The method may also include submerging the displacer into the liquid and obtaining, with the load measurement device, a net force acting on the displacer. The method may further include obtaining, with a liquid density measurement sensor disposed within the displacer cage, a liquid density at a first location of the liquid. The method may still further include determining, using, at least, the net force and the liquid density at the first location of the liquid, the level of the liquid in the vessel.

20 Claims, 7 Drawing Sheets

300 ⌐

(56)  References Cited

OTHER PUBLICATIONS

English translation of JP2018205216 from worldwide.espacenet.
com.*
Souza et al. ("A density and temperature invariant displacer-type
liquid level measuring method," 2018 IEEE International Instru-
mentation and Measurement Technology Conference (I2MTC),
Houston, TX, USA, 2018, pp. 1-5, doi: 10.1109/12MTC.2018.
8409839.) (Year: 2018).*

* cited by examiner

DENSITY INVARIANT DISPLACER-TYPE LIQUID LEVEL MEASUREMENT UTILIZING DIFFERENTIAL PRESSURE TRANSMITTER

BACKGROUND

Traditional level meters determine the level of a fluid, such as a liquid in a vessel, by measuring the buoyancy force exerted by the liquid on a displacer. Due to their low cost, accuracy, and simplicity these instruments are commonly used across many industries, including the oil and gas, pharmaceutical, and automotive industries, and also in natural water reservoirs. However, displacer level meters are sensitive to variations in density of the liquid, which may occur when temperature, pressure, or composition of the liquid change. This is particularly important in the oil and gas field, where a processing fluid may suffer from significant temperature and density variations as operating conditions change. Accordingly, there exists a need to determine the level of a liquid irrespective of density variations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a liquid level measurement device. The liquid level measurement device includes a displacer cage configured to be fluidically connected to a liquid-containing vessel through a fluid channel and a displacer disposed within the displacer cage. The liquid level measurement device further includes a load measurement device from which the displacer is suspended, and a liquid density measurement sensor configured to measure a liquid density within the displacer cage.

Embodiments disclosed herein generally relate to a method for determining a level of a liquid in a liquid-containing vessel. The liquid-containing vessel is fluidically connected to a displacer cage. The method includes obtaining, with a load measurement device, a weight force of a displacer suspended from the load measurement device and disposed within the displacer cage. The method further includes submerging the displacer into the liquid and obtaining, with the load measurement device, a net force acting on the displacer. The method further includes obtaining, with a liquid density measurement sensor disposed within the displacer cage, a liquid density at a first location of the liquid. The method further includes determining, using, at least, the net force and the liquid density at the first location of the liquid, the level of the liquid in the vessel.

Embodiments disclosed herein generally relate to a system including a liquid level measurement device. The liquid level measurement device includes a displacer cage configured to be fluidically connected to a liquid-containing vessel through a fluid channel and a displacer disposed within the displacer cage. The liquid level measurement device further includes a load measurement device from which the displacer is suspended, and a liquid density measurement sensor configured to measure a liquid density within the displacer cage. The system further includes a plurality of remote beacons and a liquid level measurement system in communication with the liquid level measurement device and the plurality of remote beacons. The liquid level measurement system includes a processor and a memory storing instructions. The instructions, when executed by the processor, cause the processor to receive, from the load measurement device, a weight force of the displacer and to receive, from the load measurement device, a net force acting on the displacer. The instructions, when executed by the processor, further cause the processor to receive, from the liquid density measurement sensor, the liquid density at a first location of the liquid and to determine, using, at least, the net force and the liquid density at the first location of the liquid, a level of the liquid in the vessel.

Other aspects and advantages of the claimed subject matter will be apparent from the following description and the appended claims.

BRIEF DESCRIPTION OF DRAWINGS

FIG. 3 depicts a system in accordance with one or more embodiments.

DETAILED DESCRIPTION

Figure 1:
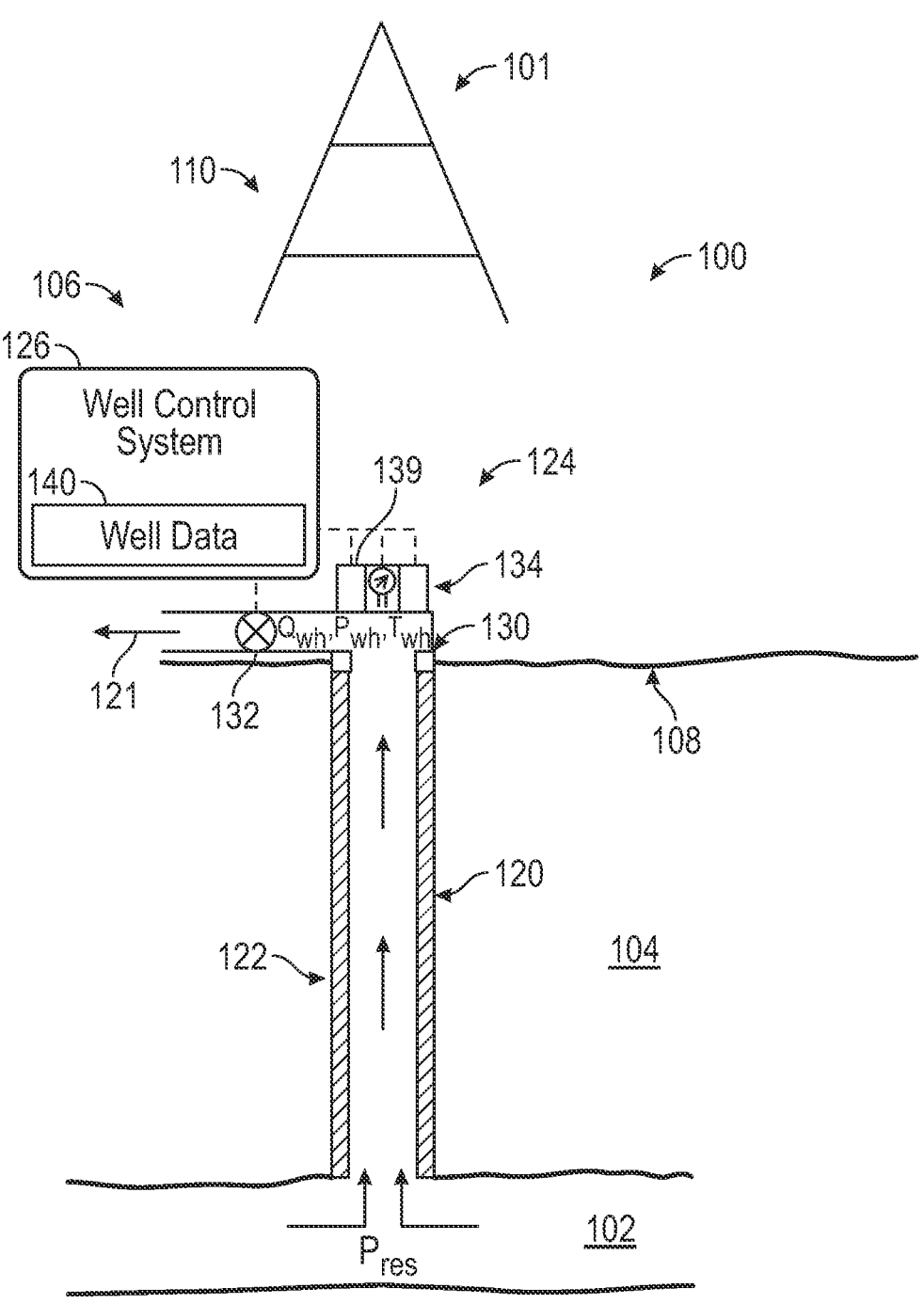
FIG. 1 depicts a well system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. For example, a "block valve" may include any number of "block valves" without limitation.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Level measurements play a vital role in many industrial applications. This measurement determines the position of an existing interface between two media in a vessel, also referred to herein as a tank. These media are usually fluids, but they may be solids or a combination of a solid and a fluid. For example, the interface may exist between a liquid and a gas, a liquid and its vapor, two liquids, or a granular solid and a gas.

Many industrial processes require the accurate level reading of a liquid or a solid (e.g., powder, granule, etc.) within a vessel. In the oil and gas field, precise level measurements of a process fluid ensure the safety and profitability of processes. Therefore, it is essential to be equipped with instruments that provide reliable level readings. In general, level measurements may be needed for various reasons, such as process efficiency, inventory, custody transfer, and safety. For example, custody transfer (i.e., the transfer of liquids (e.g., raw petroleum, refined petroleum, etc.) from one operator to another) may be based on the quantity of material in a process vessel, which often is based on the reading of a level meter. In general, custody transfer requires the highest possible accuracy of the liquid level meter. Likewise, safety and overfill prevention is a main concern for any facility used for storage of, for example, flammable liquids, and preventive measures may rely on accurate level readings.

Over the years, level measurement technology has evolved. In the past, the measurement of level did not usually demand highly accurate and sensitive devices. However, new principles of measurement are being introduced, and existing principles are continuously improved to comply with stricter quality standards. A wide variety of technologies exist to measure the level of substances in a vessel, each one exploiting a different principle of physics. These include, for example, ultrasonic, radioactive, laser, and differential pressure level meters, among others.

Displacer level meters are one of the most popular level meters in the oil and gas field. This is because displacer level meters are simple, cost-attractive, accurate, and may be installed internally or externally. Displacer level meters make use of Archimedes' Principle to detect a liquid level.

A buoyant solid object (hereinto referred to as a displacer) is partially immersed in a liquid, whose level is to be measured. The net force acting on the displacer (i.e., the vector sum of the weight force and the buoyancy force) is measured by a load measurement device, where the buoyancy force is equal to the weight of the liquid displaced by the immersed portion of the displacer (Archimedes' Principle). As liquid level increases, the displacer experiences a greater buoyancy force, making it appear lighter to the load measurement device. Since the rise in liquid level and the reduction in apparent weight of the displacer are directly proportional to each other, the load measurement device determines the liquid level by continuous monitoring the net force acting on the displacer.

Despite their advantages, one of most pressing challenges of displacer level meters is that they are sensitive to density variations. Specifically, the accuracy of the level measurement is dependent upon the stability of the liquid density and thus any variations of liquid density will impact the measurement accuracy. In general, the liquid density may change due to many factors such as variations in temperature, pressure, liquid composition, or any combination thereof. For example, if the liquid in the tank changes temperature, a density correction may be incorporated to have an accurate indication of tank level. This is particularly important in, for example, the oil and gas field, where a fluid may undergo significant temperature and density variations as operating conditions change. Accordingly, there exists a need to determine the level of a liquid irrespective of density variations.

Embodiments disclosed herein generally relate to a liquid level measurement device. The liquid level measurement device may determine the density of the liquid in-situ, thus eliminating, or greatly reducing, any effects associated with variations in liquid density. Thus, in accordance with one of more embodiments, the disclosed liquid level measurement device may enable density (and therefore temperature) invariant measurements, improving upon existing level meters.

FIG. 1 shows a schematic diagram in accordance with one or more embodiments. As shown in FIG. 1, a well environment (100) includes a hydrocarbon reservoir ("reservoir") (102) located in a subsurface hydrocarbon-bearing formation (104) and a well system (106). The hydrocarbon-bearing formation (104) may include a porous or fractured rock formation that resides underground, beneath a geological surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments, the well system (106) includes a rig (101), a drilling system (110), a logging system (not shown), a wellbore (120), a well subsurface system (122), a well surface system (124), and a well control system ("control system") (126). The drilling system (110) may include a drill string, a drill bit, and a mud circulation system for use in drilling the wellbore (120) into the formation (104). The logging system may include one or more logging tools, for use in generating well logs, based on the sensing system (134), of the formation (104). The well control system (126) may control various operations of the well system (106), such as well production operations, well drilling operation, well completion operations, well maintenance operations, and reservoir monitoring, assessment and development operations. In some embodiments, the well control system (126) includes a computer system that is the same as or similar to that of a computer system (702) described below in FIG. 7 and the accompanying description.

The rig (101) is a combination of equipment used to drill a borehole to form the wellbore (120). Major components of the rig (101) include the drilling fluid tanks, the drilling fluid pumps (e.g., rig mixing pumps), the derrick or mast, the draw works, the rotary table or top drive, the drill string, the power generation equipment and auxiliary equipment.

The wellbore (120) includes a bored hole (i.e., borehole) that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "downhole" end or "toe" of the wellbore (120). The wellbore (120) may facilitate the circulation of drilling fluids during drilling operations, flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) lowered into the hydrocarbon-bearing formation (104) or the reservoir (102) during monitoring operations (e.g., during in-situ logging operations).

In some embodiments, during operation of the well system (106), the well control system (126) collects and records well data (140) for the well system (106). The well control system (126) may include sensors for sensing characteristics of substances, including production (121), passing through or otherwise located in the well surface system (124). The sensor readings may include, at least, data about pressure, temperature, flow rate, and vibration. The sensor readings may be obtained using specialized tools such as, as least, thermometers, pressure gauges, and flowmeters (e.g., venturi meters, turbine meters, ultrasonic meters, electromagnetic meters, etc.). The well control system (126) may also include sensors for sensing characteristics of the rig (101), such as bit depth, hole depth, drilling fluid flow, hook load, rotary speed, etc. During drilling operation of the well (106), the well data (140) may include mud properties, pressure ($P_{wh}$), temperature ($T_{wh}$), flow rate ($Q_{wh}$), drill volume and penetration rates, formation characteristics, etc. In one or more embodiments, the flow rate $Q_{wh}$ is measured by a flow rate sensor (139).

To drill a subterranean well or wellbore (120), a drill string (110), including a drill bit and drill collars to weight the drill bit, may be inserted into a pre-drilled hole and rotated to cut into the rock at the bottom of the hole, producing rock cuttings. Commonly, the drilling fluid, or drilling mud, may be utilized during the drilling process. To remove the rock cuttings from the bottom of the wellbore (120), drilling fluid is pumped down through the drill string (110) to the drill bit. The drilling fluid may cool and lubricate the drill bit and provide hydrostatic pressure in the wellbore (120) to provide support to the sidewalls of the wellbore (120). The drilling fluid may also prevent the sidewalls from collapsing and caving in on the drill string (110) and prevent fluids in the downhole formations from flowing into the wellbore (120) during drilling operations. Additionally, the drilling fluid may lift the rock cuttings away from the drill bit and upwards as the drilling fluid is recirculated back to the surface. The drilling fluid may transport rock cuttings from the drill bit to the surface, which may be referred to as "cleaning" the wellbore (120), or hole cleaning.

In some embodiments, the well data (140) are recorded in real time, or near real time, and are available for review or use within seconds, minutes or hours of the condition being sensed (e.g., the measurements are available within 1 hour of the condition being sensed). In such an embodiment, the well data (140) may be referred to as "real time" well data (140). Real time well data (140) may enable an operator of the well (106) to assess a relatively current state of the well system (106) and make real time decisions regarding a development of the well system (106) and the reservoir (102), such as on-demand adjustments in drilling fluid and regulation of production flow from the well.

In some embodiments, the well surface system (124) includes a wellhead (130). The wellhead (130) may include a rigid structure installed at the "up-hole" end of the wellbore (120), at or near where the wellbore (120) terminates at the geological surface (108). The wellhead (130) may include structures for supporting (or "hanging") casing and production tubing extending into the wellbore (120). Production (121) may flow through the wellhead (130), after exiting the wellbore (120) and the well subsurface system (122), the well subsurface system including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable the unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The sensor readings may include, at least, data about pressure, temperature, flow rate, and vibration. The sensor readings may be obtained using specialized tools such as, as least, thermometers, pressure gauges, and flowmeters (e.g., venturi meters, turbine meters, ultrasonic meters, electromagnetic meters, etc.). The characteristics may include, for example, pressure ($P_{wh}$), temperature ($T_{wh}$) and flow rate ($Q_{wh}$) of production (121) flowing through the wellhead (130), or other conduits of the well surface system (124), after exiting the wellbore (120). The surface sensing system (134) may also include sensors for sensing characteristics of the rig (101), such as bit depth, hole depth, drilling fluid flow, hook load, rotary speed, etc.

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include a set of high-pressure valves and at least two chokes. These chokes may be fixed or adjustable or a mix of both. Redundancy may be provided so that if one choke must be taken out of service, the flow may be directed through another choke. Effective control of the choke assembly prevents damage to equipment and promotes longer periods of production without shutdowns or interruptions. In some embodiments, pressure valves and chokes are communicatively coupled to the well control system (126). Accordingly, a well control system (126) may obtain wellhead data regarding the choke assembly as well as transmit one or more commands to components within the choke assembly to adjust one or more choke assembly parameters.

Figure 2:
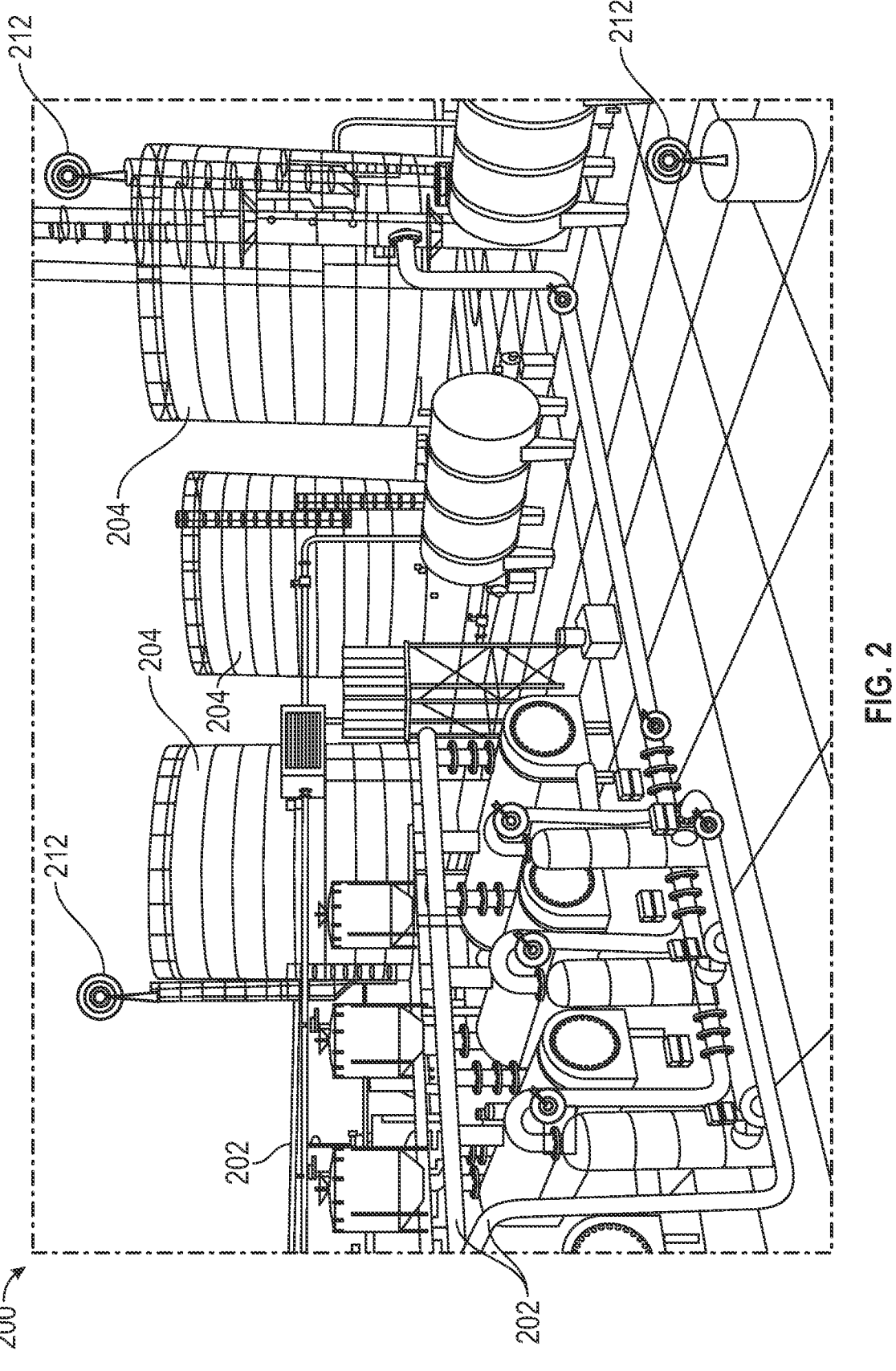
FIG. 2 depicts a system in accordance with one or more embodiments.

FIG. 2 shows an exemplary industrial facility (200), in accordance with one or more embodiments. The facility (200) may be a crude oil, a natural gas storage facility (200), or a gas-oil separation plant. In other embodiments, the facility (200) may be a hydrocarbon refinery or a chemical plant. Such facilities are characterized by a plurality of pipes (202), storage tanks (204), pressure vessels, valves, and connections. Storage tanks (204) are typically arranged in clusters (also referred to herein as tank farms) and may be at atmospheric pressure, pressurized, or at cryogenic temperatures. There are various designs of storage tanks (204) depending on the liquid and size requirements. For example, storage tanks (204) used for organic liquid storage (e.g. hydrocarbons) include fixed roof tanks (e.g., cone roof, dome roof, etc., in vertical or horizontal orientation) and floating roof tanks with various designs (e.g., external, domed, internal, etc.). In a fixed roof storage tank (204), there is a vapor space between the liquid surface and the external roof. In a floating roof storage tank (204), the liquid surface is covered by either an internal or an external floating roof. Pressurized tanks are often of either spherical or horizontal cylinder design. It should be noted that hand gauging cannot be performed on pressurized tanks. In some cases, floating roof storage tanks (204) may be fitted with one or more still-pipes going from an opening in the floating roof to a place where they measure the level (e.g., the bottom of the tank). In addition, the still-pipe may be used to access the liquid for temperature measurements and for taking samples for laboratory experiments.

In some embodiments, equipment for automatic tank gauging (ATG) may be installed on the storage tanks (204). For example, the storage tanks (204) may be equipped with a pressure transmitter, a multi-spot temperature sensor, a liquid level meter, a tank hub (for data collection from field instruments and transmission of such data), a system hub (for connecting and managing various components within a larger system), and a wireless transmitter (e.g., remote beacons (212)). In some embodiments, there may be two or more identical instruments working synchronously to measure the same liquid property, thus adding gauging redundancy to the system, as required by international engineering standards.

In accordance with one or more embodiments, FIG. 2 shows remote beacons (212). The remote beacons (212) may be distributed at different locations around the industrial plant and may emit a wireless signal with the liquid level readings of the storage tanks (204). The wireless signal emitted by the remote beacons (212) may be received by a control system (e.g., the well control system (126)) to adjust, automatically, one or more operational parameters (e.g., choke assembly parameters) to prevent overfilling of the storage tanks (204). The remote beacons (212) may further be in telecommunication with a central computer system (702) similar to the computer system (702) described below with regard to FIG. 7 and the accompanying description. The telecommunication between the remote beacons (212) and the central computer system (702) may be wireless telecommunication or may be performed using telecommunication cables. In other embodiments, maintenance operations in the storage tanks (204) may be performed based on the liquid level readings determined by the level meter and transmitted using the remote beacons (212). Examples of maintenance operations may include, but are not limited to, scheduling maintenance activities and warning alarms.

As previously stated, several methods are available as the basis for liquid level measurements, each with its own advantages and limitations. The best selection depends on the specific application (i.e., what process needs to be measured) and the degree of accuracy required. Level may be measured by both direct and indirect methods. Direct methods make physical contact with the surface of the liquid and leverage physical principles (such as fluid motion and buoyancy) to determine the liquid level. Indirect methods measure a variable other than level first (e.g., time-of-flight of a sonic/ultrasonic wave, as described in greater detail below) and then use it to determine the liquid level.

By way of an example of a direct method, consider the case of a float level meter. This device operates similarly to a displacer, except that the float swims in the liquid's surface due to the buoyancy force. The position of the float represents the liquid level and may be determined visually or by a float magnetically coupled to a transmitter. For example, in a magnetic float device, a reed switch (i.e., an electrical switch that is operated by an external magnetic field) may be used to determine the liquid level. A reed switch consists of two overlapping ferromagnetic (i.e., magnetizable) metal reeds (thin, flexible flat contacts) separated by a small gap. The reed switch is sealed within a glass tube filled with a protective inert gas. When a magnetic field is applied to the proximity of the reed switch, the reeds become magnetized and attract each other, making physical contact and closing the circuit. When the magnetic field is removed, the contacts separate, thus opening the circuit. A permanent magnet located on the float actuates the reed switch and an electrical open/closed signal determines the level as the float rises and falls with the changing liquid level.

Increasing demand for nonintrusive level meters has led to the development of time-of-flight (TOF) technologies. TOF is an indirect level measurement technique used to determine the time it takes for an object, signal, or wave to travel a certain distance. This principle is employed in various fields and technologies. In general, an emitter propagates a modulated or pulsed wave (e.g., an acoustic or electromagnetic wave) towards a target, whose reflection is then detected by a receiver (e.g., a radar antenna) after reflecting on the target's surface. Ultrasonic waves are generally understood to be longitudinal acoustic waves with frequencies above the audible range of the human ear (20 kHz). Sonic waves have frequencies within the audible range of the human ear, i.e., 20 Hz to 20 kHz. For the case of ultrasonic detectors, piezoelectric transducers are typically utilized as both the emitter and detector of ultrasonic waves. For level measurements, an ultrasonic or sonic wave propagates from an emitter located at the top of a tank through the atmosphere (i.e., above the liquid level) to a target (typically the air-liquid interface) and back to a detector. By knowing the speed of sound in the medium, the distance to the target may be obtained from the TOF.

In general, TOF measurements are sensitive to changes in temperature since the speed of sound in a media strongly depends on temperature. Further, if the detector is installed at the bottom of the tank, in which case the ultrasonic waves propagate through the liquid, the liquid properties (e.g., sound velocity, temperature, liquid composition, etc.) must be determined to accurately determine the liquid level. Ultrasound waves may also be attenuated if there is turbulence or dust present on the surface of the liquid. In general, level readings using this technique may also be limited beyond the blanking distance, defined as the minimum sensing distance of an ultrasonic device. If the level rises past this distance of the sensor, no level measurements may be made.

Measurements of level may also be accomplished using a differential pressure transmitter (DPT). DPT methods are still extensively used due to their simplicity and low cost, even after the advancement of modern technologies (e.g., TOF). DPTs have two pressure sensing elements, one exposed to the liquid at the bottom of the tank (high pressure side) and the other one typically exposed to the space above the liquid surface (low pressure side, also referenced to as "reference leg" side). In general, DPT measurements are typically made with respect to a reference pressure on the low pressure side such as, for example, atmospheric pressure. Changes in the reference pressure will not affect the DPT measurements since they are applied to both pressure sensing elements on equal amounts. In other words, the resulting forces created cancel each other, and no change in differential pressure occurs. The maximum level that may be determined using this technique is the maximum height of the liquid above the DPT, while the minimum level is determined by the DPT location in the tank.

As mentioned, since the pressure exerted by a column of liquid is directly proportional to the level and density of the liquid, the hydrostatic pressure at the bottom of the tank is higher than that at the surface due to the weight of the liquid. Thus, a DPTs may measure the pressure difference ($\Delta P$) between these two points and provide an output signal (typically an electrical signal in milliamperes, or another standardized unit) corresponding to the level of the liquid column. Level may then be determined from the pressure difference $\Delta P$ measured by a DPT as shown in Equation (1) below:

$$\text{Level} = \frac{\Delta P}{q \, \rho_l}, \qquad \text{(Equation 1)}$$

where Level is the level of the liquid column, $\Delta P$ is the differential pressure (as determined, for example, by the DPT), $\rho_l$ is the density of the liquid, and g is the gravitational acceleration. In general, to provide correct level measurements, DPTs need to be calibrated based on the relative density (i.e., the ratio of the liquid density to the water density at a specific temperature) of the liquid and in most applications the relative density is considered constant. However, as previously stated, this is not always a valid assumption, since variations in liquid composition, temperature, pressure, or any combination thereof, may affect the liquid density.

Special considerations are required for level measurements in closed- and pressurized-tank applications, which are common in the oil and gas field. Consider, for example, the case of a closed tank filled with saturated steam. In this case, the density varies significantly with a small change in pressure. If the density of the steam (or vapor) above the liquid increases, its weight will increase, causing the hydrostatic pressure above the liquid surface to also increase. This results in an accumulated effect on the pressure instrument and a larger reading of the liquid level by the DPT, although the actual level has not changed. For this reason (and other reasons not described) density variations must be carefully considered for in closed- and pressurized-tank applications.

Irrespective of which level meter is used, as previously stated, if the liquid in the tank changes composition, temperature, pressure, or any combination thereof, it is essential, if not critical, to apply density corrections to have an accurate indication of the tank level. Conventional techniques such as the ones described above (and others not described) may provide an estimate of the level, only if the liquid density remains constant. Unfortunately, as previously stated, liquid density may change due to many factors such as variations in temperature, pressure, and liquid composition, among others. This is typically the case in, for example, processes found in the oil and gas field. Thus, taken together, these techniques may misidentify the true liquid level in a tank and cause serious safety accidents. For example, tank overfill may cause fires and explosions that spread to other tanks in a tank farm. This could take place, for example, if a sudden change in the density of a process liquid in a hydrocarbon production facility causes a level meter to determine a faulty reading. Consequently, a reliable level meter that determines the level of a liquid irrespective of density variations is desirable.

One with ordinary skill in the art will recognize that other methods to determine liquid level beyond floats, TOF, and DPTs exists. Descriptions of a select few methods herein do not impose a limitation on the methods for determining liquid level encompassed by this disclosure.

Figure 3:
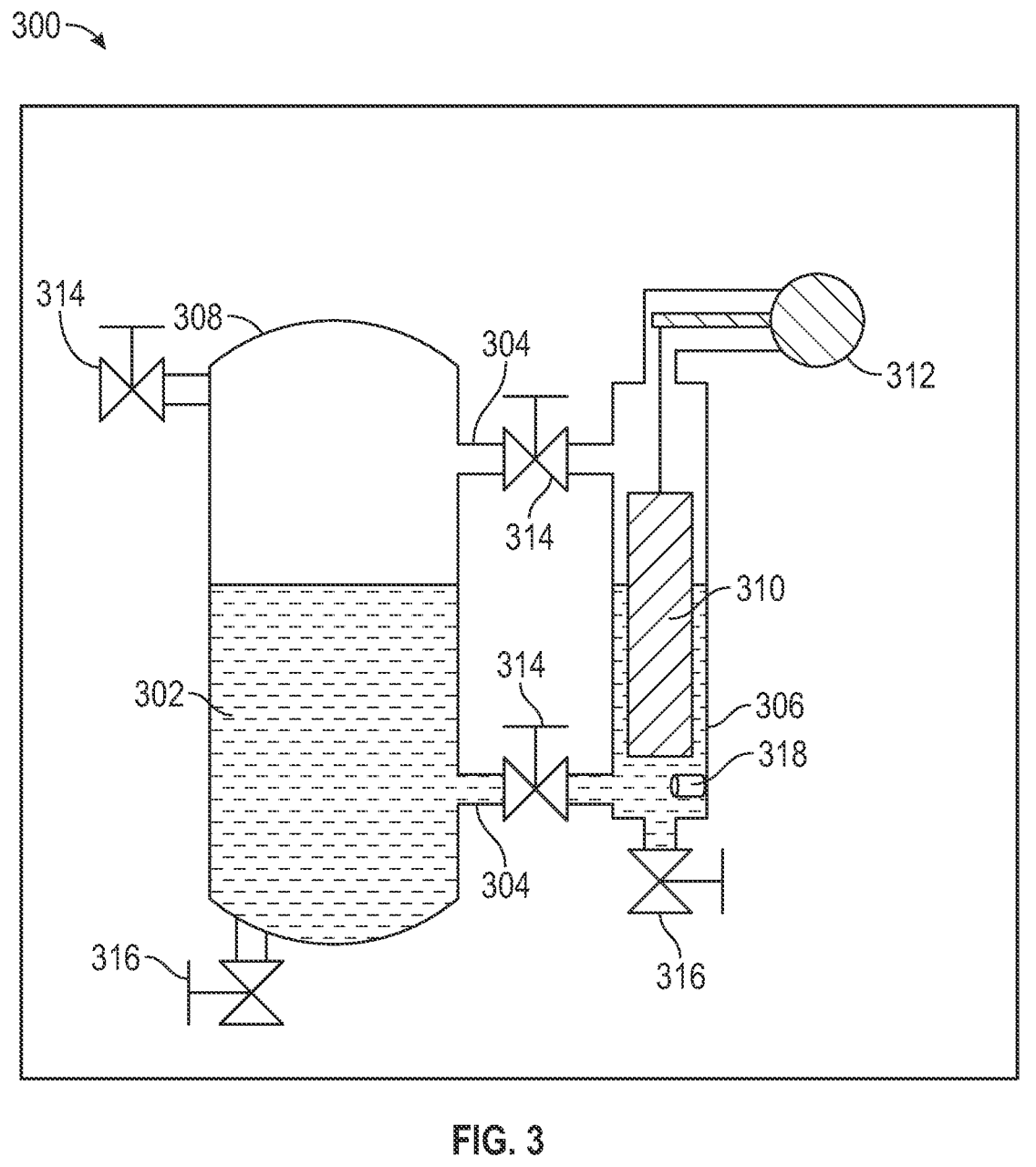

FIG. 3 shows a schematic view of a displacer level meter (300) in accordance with one or more embodiments. As previously stated, displacer level meters (300) make use of Archimedes' Principle to detect a liquid level by measuring the net force acting on the displacer using a load measurement device (312). The buoyancy force is equal to the weight of the liquid (302) displaced by the immersed portion of the displacer (Archimedes' Principle). As liquid level increases, the displacer (310) experiences a greater buoyancy force, making it appear lighter to the load measurement device (312). Since the rise in liquid level and the reduction in apparent weight of the displacer are directly proportional to each other, the load measurement device (312) determines the liquid level by continuously monitoring the net force acting on the displacer.

The displacer (310) typically takes the form of a sealed metal tube and is disposed within a displacer cage (306) which is, in turn, fluidically connectable to a liquid-containing vessel (308). The mass of the displacer (310) is selected in such a way that its weight is always greater than the maximum buoyancy force, but less than the maximum load supported by the load measurement device (312). In other words, the displacer (310) is always partially immersed in the liquid (302) and does not float. The displacer (310) is connected to a vessel (308) through a plurality of fluid channels (304) which may include, for example, one or more nozzles. One or more block valves (314) are used to control (e.g., block, isolate, etc.) the flow of liquid (302) between the vessel (308) and the displacer cage (306). A block valve (314) may also be used to fill up the vessel (308). Further, the block valves (314) ensure that the liquid level within the displacer cage (306) matches the level of the vessel (308) during operation. One or more drain valves (316) allow to empty the vessel (308) and the displacer cage (306) of liquid (302) for servicing and calibration. For example, calibration may be done by filling the displacer cage (306) with liquid, also known as wet calibration. Calibration may also be done without a liquid (dry calibration) by suspending the displacer (310) from a string and manually applying a tension force on the displacer (310). In either case, the displacer level meter (300) is calibrated to read a full level when the maximum buoyancy force condition is met, i.e., when the displacer (310) is fully submerged in the liquid (302).

In accordance with one or more embodiments, a liquid density measurement sensor (318) located inside the displacer cage (306) is used to determine the liquid (302) density. There are many types of liquid density measurement sensors (318) designed for different applications and substances. Examples of liquid density measurement sensors (318) include, but are not limited to, Coriolis, nuclear, microwave, ultrasonic, and DPTs sensors. For example, the vibrating frequency of a Coriolis meter flow tube is used to determine the density of the fluid flowing through the flow tube by means of the Coriolis effect. As the fluid becomes denser, the vibrational frequency decreases. As another example, a DPT calculates the density of the liquid (302) from the resulting differential pressure ΔP between the high and low pressure sides, as discussed in greater detail below in the instant disclosure with regard to FIG. 5 and the accompanying description.

In some embodiments, the displacer level meter (300) may not include a displacer cage (306). For example, in cageless displacer level meters (300) the displacer (310) is located directly inside the vessel (308). However, generally, cageless displacer level meters (300) suffer from several limitations. For example, cageless displacer level meters (300) may not be serviced without depressurizing or emptying the entire vessel (308) containing the liquid (302) whose level needs to be measured. In addition, level readings using a cageless displacer level meters (300) may also be susceptible to any mechanical disturbances or turbulence within the vessel (308). This may occur, for example, when mixer/stir blades are installed in the vessel (308) to aid in the mixing of one or more solvents.

Load measurement devices (312) convert a force (e.g., tension, compression, pressure, torque, etc.) into a standardized signal that may be measured. In other words, a load measurement device (312) is a force transducer that outputs an electrical, pneumatic, hydraulic, etc. signal proportional to the applied force. The most common types of load measurement devices (312) for industrial applications include, for example, pneumatic, strain gauge, and hydraulic devices. For example, a strain gauge load measurement device (312) consists of a metal structure with attached strain gauges. The metal structure is typically made of aluminum or stainless steel, making it sturdy but elastic, thus capable of returning to its original shape if deformed. When a force is applied, the strain gauges deform together with the metal structure, causing a change in their electrical resistance. This change is proportional to the amount of force applied and may be measured by a circuit sensitive to small changes in resistance, such as, for example, a Wheatstone bridge circuit. An amplifier circuit (e.g., an operational amplifier) may be used to amplify the small voltage difference across the bridge, thus increasing the overall sensitivity of the system.

A Wheatstone bridge circuit consists of four resistors (e.g., strain gauges) arranged in a diamond shape (bridge configuration) and a voltage excitation source. The output voltage of the Wheatstone bridge is measured across the bridge's central node. When the bridge is balanced, (i.e., when the ratio of resistances on one side equals the ratio on the other side) the voltage across the central node is zero. Any changes in the resistance of the four resistors may cause an imbalance, leading to a measurable voltage across the central node. Thus, by calibrating the system, the change in voltage may be correlated with the applied force or strain, allowing for precise measurements with a high level of sensitivity.

Figure 4:
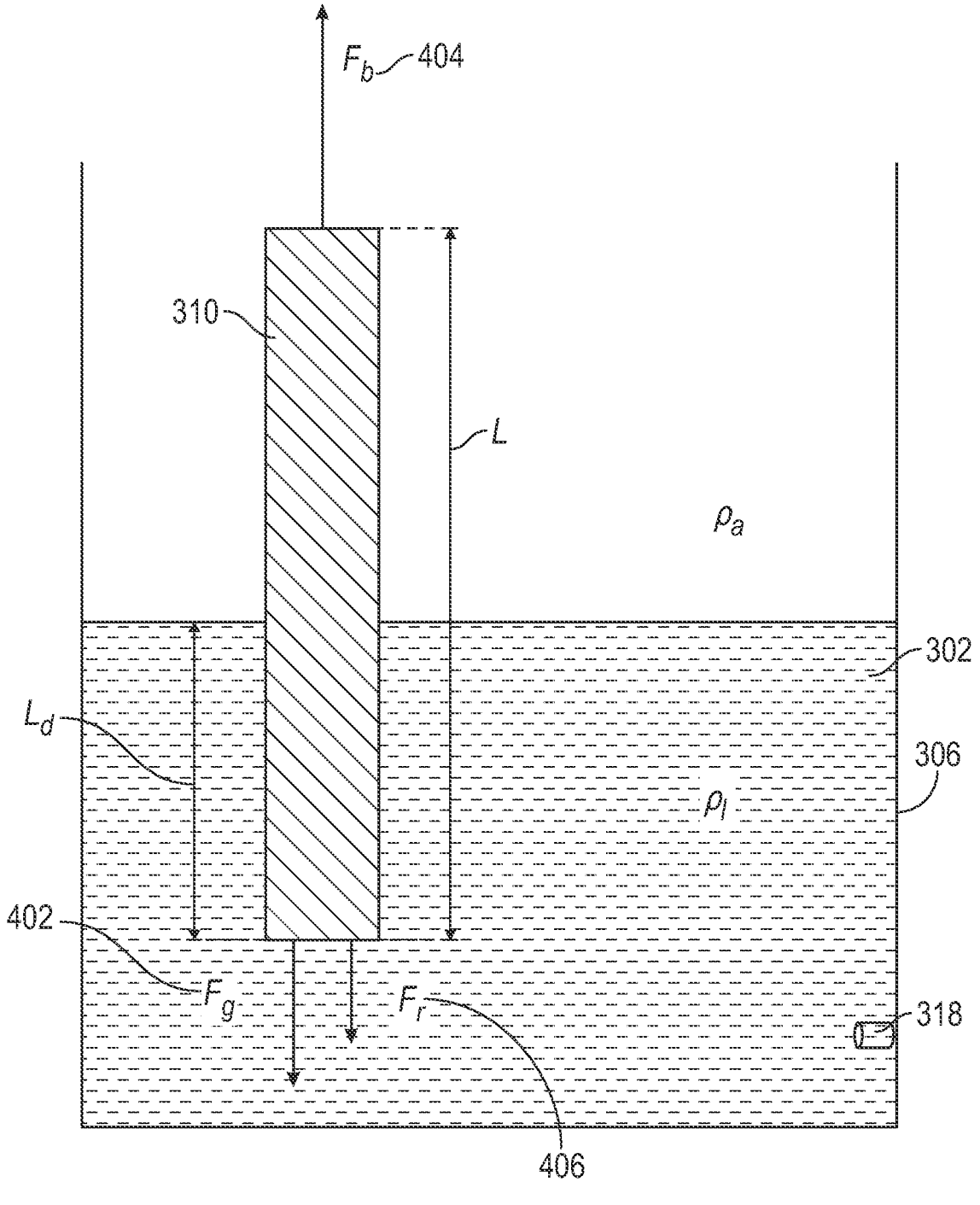
FIG. 4 depicts a system in accordance with one or more embodiments.

In accordance with one or more embodiments, FIG. 4 shows, in greater detail, the principle of operation of a displacer level meter (300). As previously stated, displacer level meters (300) make use of Archimedes' Principle to detect a liquid level by measuring the net force (406) acting on the displacer using a load measurement device (312). The weight force (402) due to gravity and the buoyancy force (404) acting on the displacer (310) may be calculated as:

$$F_g = mg, \tag{Equation 2}$$

$$F_b = \rho_l g A L_d + \rho_a g A (L - L_d), \tag{Equation 3}$$

where m is the mass of the displacer, g is the gravitational acceleration, $\rho_l$ is the density of the liquid, $\rho_a$ is the density of air, A is the cross-sectional area of the displacer (310), $L_d$ is the dipping length (i.e., the partial length of the displacer (310) that is submerged in the liquid (302)), L is the total length of the displacer (310), $F_g$ is the weight force (402), and $F_b$ is the buoyancy force (404). The cross-sectional area A of the displacer (310) is assumed to be constant over the total length L of the displacer (310). Further, in Equation (3) the buoyancy force (404) due to the air (i.e., $\rho_a g A (L - L_d)$) is herein assumed to be negligible in comparison with the buoyancy force (404) due to the liquid (i.e., $\rho_l g A L_d$). This is a reasonable assumption because the densities of gases are, in general, much less than those of liquids, since the atoms in a gas are separated by large amounts of empty space.

As noted, the mass of the displacer (310) is selected in such a way that its weight is always greater than the maximum buoyancy force. Therefore, the displacer (310) never floats in the liquid (302). Further, the weight force (402) will be registered and calibrated by the displacer level meter (300) to read a zero level when there is no liquid in the displacer cage (306). As the liquid level in the displacer cage (306) rises, the buoyancy force (404) acting on the displacer increases. This buoyancy force (404) acts in the opposite direction of gravity thus resulting in a reduced apparent weight of the displacer (310). The net force (406) acting on the displacer (310) may be expressed as:

$$F_r = F_g - F_b = mg - \rho_l g A L_d, \tag{Equation 4}$$

where $F_r$ is the net force (406). Solving Equation (4) for the dipping length $L_d$ (i.e., the liquid level) results in:

$$L_d = \frac{mg - F_r}{\rho_l g A}, \tag{Equation 5}$$

Equation (5) is the main equation displacer level meters (300) use to determine the liquid level. Further, Equation (5) shows that the liquid level $L_d$ is proportional to the net force (406) $F_r$, as previously stated. Notice that, in Equation (4) and Equation (5), the buoyancy force (404) due to the air has not been considered. As noted, this is a reasonable assumption since densities of gases are, in general, much less than those of liquids. The mass m and cross-sectional area A of the displacer (310) may be known or measured.

For displacer level meters (300) such as the ones shown in FIG. 3 and FIG. 4, and others not shown, the liquid (302) density $\rho_l$ is assumed to be constant in Equation (5). Thus, commonly, the level is determined by only measuring the net force (406) $F_r$ using a load measurement device (312). However, as previously stated, assuming a constant liquid density $\rho_l$ is not always a valid assumption, since variations in liquid (302) composition, temperature, pressure, or any combination thereof, affect the liquid (302) density. By way of an example, a faulty level meter reading caused by a sudden change in the density of a process liquid in a hydrocarbon production facility may lead to a serious safety incident. Accordingly, an improved method to determine a liquid level by ensuring the displacer level meter (300) reading is insensitive to the liquid (302) density is desired.

Figure 5:
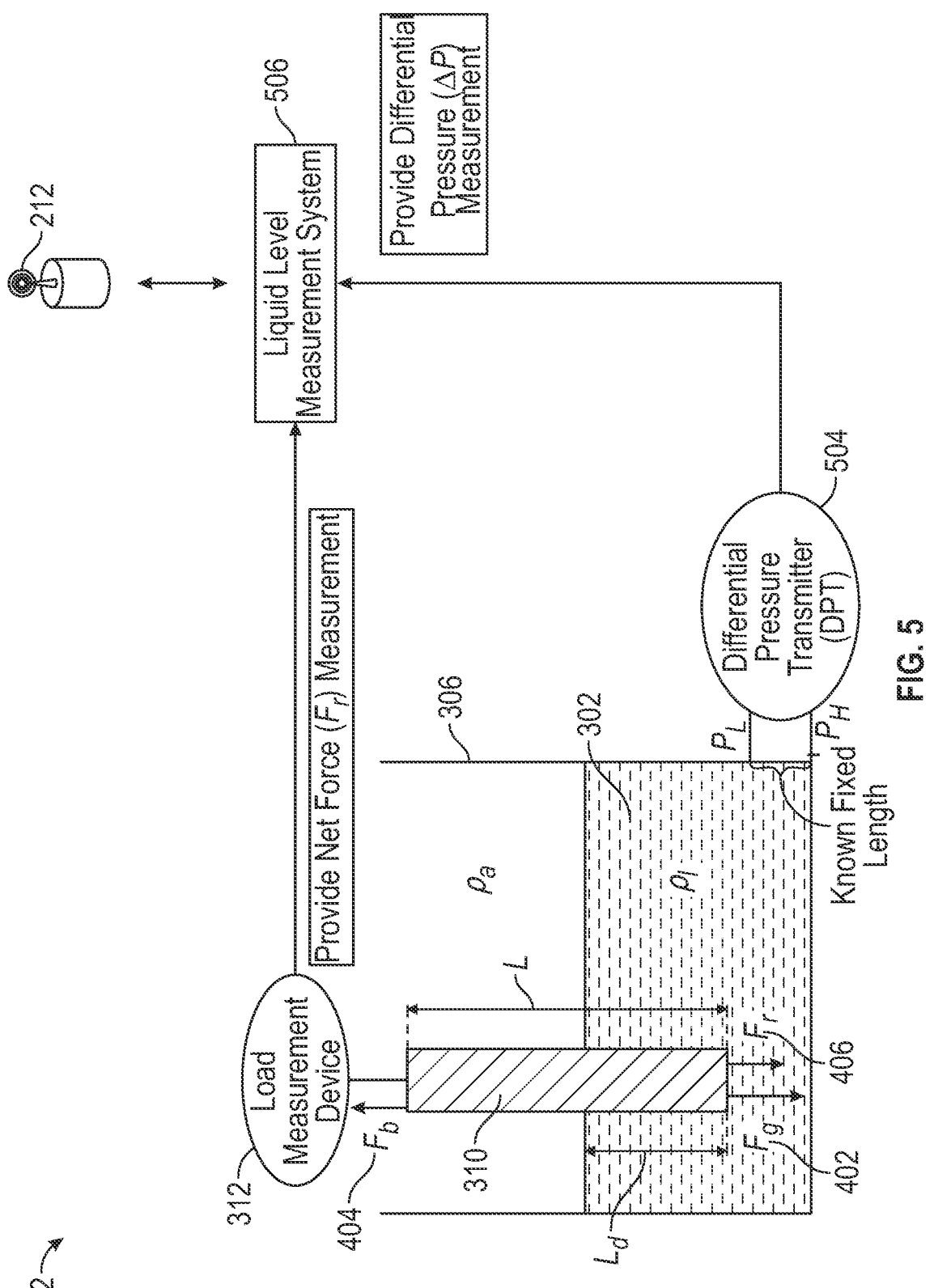
FIG. 5 depicts a system in accordance with one or more embodiments.

In accordance with one or more embodiments, FIG. 5 shows a liquid level measurement device (502) for level metering irrespective of density variations. The liquid level measurement device (502) consists of a displacer level meter (300) integrated with a liquid density measurement sensor (318). In such an embodiment, the liquid density measurement sensor (318) is a DPT (504). As previously stated, DPTs (504) have two pressure sensing elements, one exposed to a high pressure $P_H$ and the other one exposed to a low pressure $P_L$. In the present embodiment, both high and low pressure sides are mounted at a fixed and known distance $L_{\Delta P}$ from each other. Further, the high and low pressure sides are located below the liquid (302) surface (e.g., at the bottom of the displacer cage (306) as shown in FIG. 5) to ensure that they are immersed in the liquid (302) at all times. The DPT calculates the density of the liquid (302) using the differential pressure $\Delta P$ reading between the high and low pressure sides:

$$\rho_l = \frac{\Delta P}{gL_{\Delta P}}, \qquad \text{(Equation 6)}$$

where $L_{\Delta P}$ is the fixed distance between the high ($P_H$) and low ($P_L$) pressure sides. Therefore, all parameters in Equation (6) are known, except for the differential pressure $\Delta P$, which is determined by the DPT (504). Thus, in accordance with one or more embodiments, the density of the liquid (302) is determined in-situ using Equation (6) and is not assumed constant in the present invention.

Embodiments disclosed herein generally relate to a liquid level measurement system (506) that determines the level of a liquid (302) irrespective of density variations. As previously stated, Equation (5) shows that the liquid level may be determined if the liquid (302) density $\rho_l$ is known. Further, in accordance with one or more embodiments, Equation (6) shows that the density of the liquid (302) is determined in-situ in the present invention by the DPT (504). Accordingly, Equation (5) and Equation (6) may be combined to determine the liquid level in a manner insensitive to density variations, thus eliminating, or greatly reducing, any effects associated with variations in liquid (302) density. Assuming the density of the liquid (302) is homogenous (i.e., uniform) within the displacer cage (such that the density terms in Equation (5) and Equation (6) cancel) yields:

$$L_d = \frac{L_{\Delta P}(mg - F_r)}{\Delta PA}, \qquad \text{(Equation 7)}$$

In some embodiments, the liquid level measurement device (502) includes the liquid level measurement system (506). Further, the liquid level measurement system (506) may include hardware and/or software with functionality for determining the liquid level in a vessel (308) using Equation (7). For this purpose, the system may include memory with one or more data structures, such as a buffer, a table, an array, or any other suitable storage medium. In some embodiments, the liquid level measurement system (506) may include a computer system similar to the computer system (702) described below with regard to FIG. 7 and the accompanying description. While the liquid level measurement system (506) is shown located at the same site as the liquid level measurement device (502) in FIG. 5, in some embodiments, the liquid level measurement system (506) may be located remotely from the liquid level measurement device (502). Thus, the liquid level measurement system (506) enables density (and therefore temperature) invariant measurements, improving upon existing level meters. In addition, it allows organizations to implement backup safety measures (e.g., overfill protection) and mitigate risk ahead of time, fostering a safer work environment, and a more efficient resource allocation.

In another embodiment of the present invention, the liquid levels of one or more tanks (e.g., the storage tanks (204) of FIG. 2) are monitored in real time, or near real time, using the liquid level measurement system (506) and maintenance operations are automatically performed based on this determination. Maintenance operations may include, for example, transmitting one or more commands to a control system to adjust, automatically, one or more operational parameters to prevent overfilling. In other embodiments, maintenance operations may include scheduling maintenance activities and warning alarms.

In some embodiments, maintenance operations are prioritized when certain indicators show signs of increased risk. In general, the higher the levels in the one or more tanks (e.g., the storage tanks (204) of FIG. 2), the higher the chance of overfilling, thus the higher the risk. In such an embodiment, a user determines a threshold, and the liquid levels are continuously compared to the threshold. The liquid levels that are equal to or higher than the threshold raise a flag that the one or more tanks are likely to overfill. Alternatively, the liquid levels that are lower than the threshold do not raise a flag, and the process continues to operate without interruptions.

In accordance with one or more embodiments, the liquid level measurement system (506) may be configured to receive signals from the plurality of remote beacons (212). Further, the liquid level measurement system (506) may be configured to transmit data to the remote beacons (212). The data may include liquid level readings of the one or more tanks (e.g., the storage tanks (204) of FIG. 2). The time interval between the repeat liquid level readings may be a regular predetermined interval or may be a variable interval based, at least in part, on the previous recorded values and the threshold that defines when the equipment can be safely operated. For example, if the most recent recorded level value of the one or more tanks (e.g., the storage tanks (204) of FIG. 2) has changed significantly from previous values, the next recording is made after a shorter interval.

In another embodiment of the present invention, maintenance operations include continuously transmitting (using, for example, the remote beacons (212)) one or more commands to a control system (e.g., the well control system (126)) to adjust, automatically, one or more operational parameters (e.g., choke assembly parameters) to prevent overfilling. By continuously adjusting the operational parameters across the oil and gas field, the one or more tanks (e.g., the storage tanks (204)) are operated in an optimal state, greatly reducing the periods of production with shutdowns and interruptions. This, in turn, ensures the safety and profitability of processes.

Figure 6:
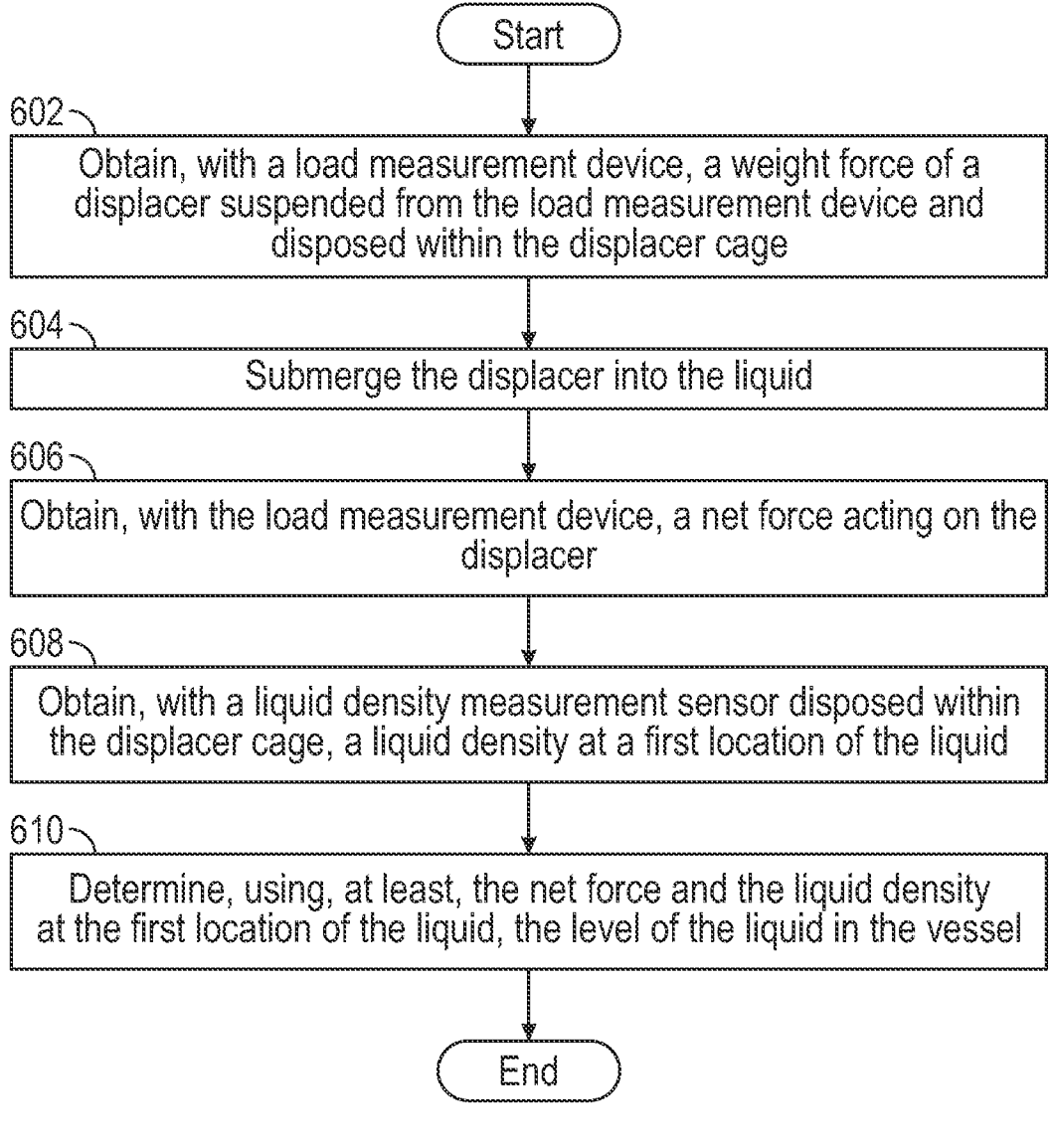
FIG. 6 depicts a flowchart in accordance with one or more embodiments.

FIG. 6 depicts a method for determining a level of a liquid (302) in a liquid-containing vessel (308) fluidically connected to a displacer cage (306), in accordance with one or more embodiments. In Block 602, a weight force (402) of a displacer (310) is obtained with a load measurement device (312). The displacer (310) is suspended from the load measurement device (312) and is disposed within the displacer cage (306). The most common types of load measurement devices (312) for industrial applications include pneumatic, strain gauge, and hydraulic devices. For example, strain gauge load measurement device (312) is a device used to measure force or load by converting mechanical deformation (e.g., strain) into an electrical signal. When the strain gauge load measurement device (312) undergoes deformation due to the applied force, the strain gauges deform, causing a change in their electrical resistance. This change is then measured and converted into an electrical signal proportional to the applied force using a circuit sensitive to small changes in resistance, such as, for example, a Wheatstone bridge.

In Block 604, the displacer (310) is submerged into the liquid (302). The mass of the displacer (310) is selected in such a way that its weight is always greater than the maximum buoyancy force, i.e., the displacer (310) is always partially immersed in the liquid (302) and does not float.

In Block 606, the net force acting on the displacer (310) (i.e., the vector sum of the weight force (402) and the buoyancy force (404)) is obtained using a load measurement device (312). The buoyancy force (404) is equal to the weight of the liquid (302) displaced by the immersed portion of the displacer (310) (Archimedes' Principle). As liquid (302) level increases, the displacer (310) experiences a greater buoyancy force (404), making it appear lighter to the load measurement device (312). Since the rise in liquid (302) level and the reduction in apparent weight of the displacer (310) are directly proportional to each other, the load measurement device (312) determines the liquid (302) level by continuous monitoring the net force (406) acting on the displacer (310).

In Block 608, the liquid (302) density is obtained with a liquid density measurement sensor (318) at a first location of the liquid (302). The liquid density measurement sensor (318) is disposed within the displacer cage (306) and may be, for example, a DPT (504). DPTs have two pressure sensing elements, one exposed to the liquid at the bottom of the tank (high pressure side) and the other one typically exposed to a lower pressure (also referenced to as low pressure side or "reference leg" side). In accordance with one or more embodiments, both high and low pressure sides are located at the bottom of the displacer cage (306) in the present invention to ensure the DPT is always immersed in the liquid (302). The differential pressure ΔP between the high and low pressure sides is determined by the DPT.

Consequently, using Equation (6), the density of the liquid (302) is determined in-situ and is not assumed constant in the present invention.

In Block 610, the level of the liquid (302) in the vessel (308) is determined using, at least, the net force (406) and the liquid (302) density at the first location of the liquid (302). The net force (406) acting on the displacer (310) is determined using a load measurement device (312) such as, for example, a strain gauge load measurement device (312). The liquid (302) density at the first location of the liquid (302) is determined using, for example, a DPT (504). Thus, the level of the liquid (302) in the vessel (308) is determined irrespective of density variations by implementing Equation (7) on a computer system that is the same as or similar to that of the computer system (702) described below.

Figure 7:
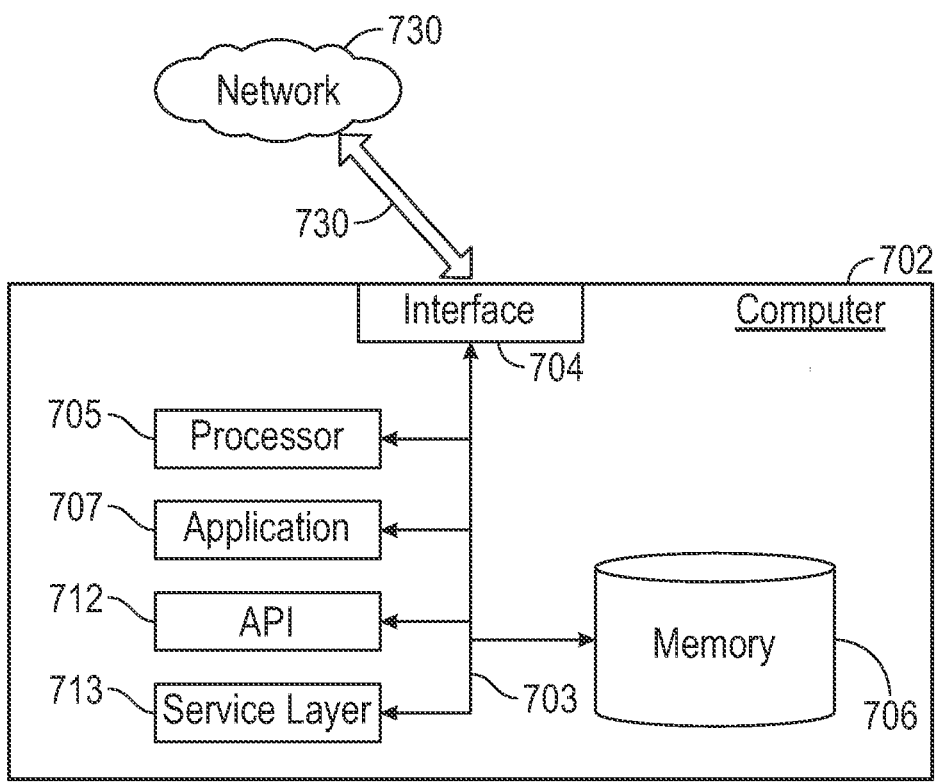
FIG. 7 depicts a computing system in accordance with one or more embodiments.

Embodiments may be implemented on a computer system. FIG. 7 is a block diagram of a computer system (702) used to provide computational functionalities associated with described algorithms, methods, functions, processes, flows, and procedures as described in the instant disclosure, according to one or more embodiments. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device such as an edge computing device, including both physical or virtual instances (or both) of the computing device. An edge computing device is a dedicated computing device that is, typically, physically adjacent to the process or control with which it interacts. For example, Equation (7) may be implemented on an edge computing device to quickly determine the liquid level in a vessel (308) and automatically perform maintenance operations.

Additionally, the computer (702) may include a computer that includes an input device, such as a keypad, keyboard, touch screen, or other device that may accept user information, and an output device that conveys information associated with the operation of the computer (702), including digital data, visual, or audio information (or a combination of information), or a GUI.

The computer (702) may serve in a role as a client, network component, a server, a database or other persistency, or any other component (or a combination of roles) of a computer system for performing the subject matter described in the instant disclosure. In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) may receive requests over network (730) from a client application (for example, executing on another computer (702) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) may communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that may be connected to the network (730). The memory may be a non-transitory computer readable medium. For example, memory (706) may be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) may be external to the computer (702).

The application (707) is an algorithmic software engine providing functionality according to particular needs, desires, or particular implementations of the computer (702), particularly with respect to functionality described in this disclosure. For example, application (707) may serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) may be external to the computer (702).

There may be any number of computers (702) associated with, or external to, a computer system containing computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A liquid level measurement device, comprising:
a displacer cage configured to be fluidically connected to a liquid-containing vessel through a fluid channel;
a displacer disposed within the displacer cage;
a load measurement device from which the displacer is suspended; and
a liquid density measurement sensor configured to measure a liquid density within the displacer cage.

2. The liquid level measurement device of claim 1, wherein the load measurement device is configured to measure a net force acting on the displacer.

3. The liquid level measurement device of claim 1, wherein the load measurement device comprises a strain gauge.

4. The liquid level measurement device of claim 1, wherein the displacer comprises a sealed metal tube.

5. The liquid level measurement device of claim 2, wherein the net force comprises a vector sum of a weight force and a buoyancy force.

6. The liquid level measurement device of claim 5, wherein the weight force of the displacer is greater than a maximum buoyancy force acting on the displacer.

7. The liquid level measurement device of claim 5, wherein the weight force of the displacer is less than a maximum load of the load measurement device.

8. The liquid level measurement device of claim 3, wherein the strain gauge comprises a transducer configured to convert a force into an electrical signal using a Wheatstone bridge circuit and an amplifier circuit.

9. The liquid level measurement device of claim 1, wherein the liquid density measurement sensor comprises a differential pressure transmitter.

10. A method for determining a level of a liquid in a liquid-containing vessel fluidically connected to a displacer cage, the method comprising:

obtaining, with a load measurement device, a weight force of a displacer suspended from the load measurement device and disposed within the displacer cage;

submerging the displacer into the liquid;

obtaining, with the load measurement device, a net force acting on the displacer;

obtaining, with a liquid density measurement sensor disposed within the displacer cage, a liquid density at a first location of the liquid; and determining, using, at least, the net force and the liquid density at the first location of the liquid, the level of the liquid in the vessel.

11. The method of claim 10, wherein the load measurement device comprises a strain gauge.

12. The method of claim 10, wherein the liquid density measurement sensor comprises a differential pressure transmitter.

13. The method of claim 10, further comprising:

performing, in response to the level of the liquid in the vessel, a maintenance operation on the vessel.

14. The method of claim 13, wherein the maintenance operation comprises adjusting operational parameters.

15. A system comprising:

a liquid level measurement device, comprising:

a displacer cage configured to be fluidically connected to a liquid-containing vessel through a fluid channel;

a displacer disposed within the displacer cage;

a load measurement device from which the displacer is suspended; and a liquid density measurement sensor configured to measure a liquid density within the displacer cage;

a plurality of remote beacons; and a liquid level measurement system in communication with the liquid level measurement device and the plurality of remote beacons, the liquid level measurement system comprising a processor and a memory, the memory storing instructions that, when executed by the processor, cause the processor to:

receive, from the load measurement device, a weight force of the displacer;

receive, from the load measurement device, a net force acting on the displacer;

receive, from the liquid density measurement sensor, the liquid density at a first location of the liquid; and determine, using, at least, the net force and the liquid density at the first location of the liquid, a level of the liquid in the vessel.

16. The system of claim 15, wherein the liquid level measurement system is configured to transmit the level of the liquid in the vessel to at least one of the plurality of remote beacons.

17. The system of claim 15, wherein the processor is configured to receive the level of the liquid in the vessel from the remote beacons.

18. The system of claim 15, wherein the liquid level measurement system performs, in response to the level of the liquid in the vessel, a maintenance operation on the vessel.

19. The system of claim 18, wherein the maintenance operation comprises adjusting operational parameters.

20. The system of claim 15, wherein the liquid density measurement sensor comprises a differential pressure transmitter.

* * * * *